United States Patent
Koyama et al.

(10) Patent No.: US 7,982,617 B2
(45) Date of Patent: Jul. 19, 2011

(54) GAME BETTING DEVICE

(75) Inventors: Toshimi Koyama, Tokyo (JP); Jun Fujimoto, Tokyo (JP); Nobuyuki Nonaka, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 357 days.

(21) Appl. No.: 12/207,756

(22) Filed: Sep. 10, 2008

(65) Prior Publication Data

US 2009/0085752 A1    Apr. 2, 2009

(30) Foreign Application Priority Data

Oct. 2, 2007 (JP) ................................. 2007-258521

(51) Int. Cl.
*G08B 13/14* (2006.01)
(52) U.S. Cl. .................. 340/572.7; 340/572.8; 343/742; 463/25
(58) Field of Classification Search ............... 340/572.1, 340/572.7, 572.8; 463/25; 343/741, 742, 343/866
See application file for complete search history.

(56) References Cited

U.S. PATENT DOCUMENTS

| | | | | |
|---|---|---|---|---|
| 5,651,548 A | * | 7/1997 | French et al. | 463/25 |
| 2007/0035399 A1 | * | 2/2007 | Hecht et al. | 340/572.1 |
| 2007/0167134 A1 | * | 7/2007 | Vuza | 455/41.2 |
| 2007/0293303 A1 | * | 12/2007 | Shayesteh | 463/25 |

FOREIGN PATENT DOCUMENTS

| JP | 2004-102953 | 4/2004 |
|---|---|---|
| JP | 2004-105321 | 4/2004 |

OTHER PUBLICATIONS

U.S. Appl. Appl. No. 12/389,742, filed Feb. 20, 2009, Koyama.

* cited by examiner

*Primary Examiner* — Thomas J Mullen
(74) *Attorney, Agent, or Firm* — Oblon, Spivak, McClelland, Maier & Neustadt, L.L.P.

(57) ABSTRACT

Antennas 21 generate electromagnetic waves that cause an RFID tag to generate electricity, the RFID tag being provided in a game chip placed on an upper surface of a betting board 4. A plurality of the antennas 21 are provided in association with each bet portion 3 on the betting board 4. Antennas 31 receive a signal from the RFID tag. Each of the antennas 31 is provided in association with the plurality of antennas 21. A set of the plurality of antennas 21 associated with the respective antennas 31 is driven while successively being changed over among the antennas 21, for each set of the antennas 21 associated with each antenna 31. Further, each antenna 31 is driven at least while any of the plurality of antennas 21 associated with this antenna 31 generates electromagnetic waves.

3 Claims, 16 Drawing Sheets

GAME BETTING DEVICE

CROSS-REFERENCE TO RELATED APPLICATIONS

This application claims benefit of priority based on Japanese Patent Application No. 2007-258521 filed on Oct. 2, 2007. The contents of this application are incorporated herein by reference in their entirety.

BACKGROUND OF THE INVENTION

1. Field of the Invention

The present invention relates to a game betting device which enables players to bet game chips during games using a roulette wheel or the like.

2. Discussion of the Background

JP-A 2004-105321 and JP-A 2004-102953 disclose techniques of having radio waves transmitted from an X-side transmission antenna and a Y-side transmission antenna, having radio waves generated from fluxes that are vertical to a table at the X-Y cross point, and then reading IDs of RFID tags (radio frequency identification tags) provided in chips placed on the table at this cross point, the reading successively performed for each bet portion.

A betting board for use in table games such as roulettes in casinos and the like has an upper surface having frames displayed thereon, and the upper surface is partitioned into a plurality of sections (bet portions) by the frames. Further, players are enabled to bet by placing chips on the upper surface. Thereafter, information in the RFID tags in the chips betted on the respective bet portions are read, as in the techniques of JP-A 2004-105321 and JP-A 2004-102953.

FIG. 12 is a plan view of a portion of an upper surface 101 of a betting board. The upper surface 101 has a plurality of bet portions 103 defined by frames 102. The same figure illustrates some of the plurality of bet portions 103. In the case of such a betting board, in order to provide RFID tags in betting chips and to enable reading of information in the RFID tags in the chips which have been betted, it is possible to employ the following structure.

Namely, as illustrated in FIG. 13, a plurality of loop-shaped antennas (antenna coils) 104 for reading RFID tags are provided in the betting board. The antennas 104 are provided in association with the respective bet portions 3 and are placed along the frames 102 which form the boundaries of the bet portions 103. The antennas 104 of A1 to A6 in FIG. 13 are associated with the respective bet portions 103 in FIG. 12.

FIG. 14 illustrates positional relationships between chips 105 placed on the upper surface 101 and the antennas 104. In the example of the same figure, the RFID tags in the respective chips 105 can be read by the antennas 104 of A1, A5 and A6. Further, usually, chips are placed such that they are stacked on the upper surface 101, and such plurality of chips stacked at the same position can be also read by a single antenna 104. Further, it is possible to read the RFID tags in all the chips 105 placed on the betting board, by performing operations for reading the RFID tags while successively changing over among the plurality of antennas 104.

The bet positions where the chips 105 can be placed on the betting board during roulette games include bet positions on both of the adjacent bet portions 103 as illustrated in FIG. 15, in addition to bet positions which fit in respective bet portions 103 on the betting board as illustrated in FIG. 14. In the example of FIG. 15, for the chip 105 placed on an antenna 104 of A1 (the bet portion 103 having the antenna 104 of A1 placed therein) and an antenna 104 of A4 (the bet portion 103 having the antenna 104 of A4 placed therein), both of the antennas 104 can read the RFID tag in this chip 105 when the output of reading radio waves is sufficient; it is therefore possible to determine that this chip 105 is placed on the antenna 104 of A1 and the antenna 104 of A4. On the other hand, for the chip 105 placed on the four antennas 104 of A2, A3, A5 and A6, the areas of the chip 105, overlaid on the respective antennas 104, are significantly small, which makes it difficult to read the RFID tag provided in this chip 105. Further, in cases where a plurality of chips 105 are stacked, it is almost impossible to read the RFID tags in the chips 105 stacked at upper portions.

FIG. 16 illustrates an exemplary structure of a betting board for overcoming the aforementioned problem. In the example of FIG. 16, there are provided antennas 104 having sizes which are half that of the aforementioned example. Further, the antennas 104 are placed at the center portions of the respective bet portions 103 and at the boundary portions between adjacent bet portions 103 (the positions of the four corner portions of each rectangular bet portion 103 and the positions between these corner portions). With this placement, it is possible to read the RFID tag in a chip 105 placed at the center portion of a bet portion 103, by the antenna 104 placed at the center portion of this bet portion 103. Further, it is possible to read the RFID tag in a chip 105 placed at the boundary portion between adjacent two bet portions 3, by the antenna 104 placed at this boundary portion. Further, it is possible to read the RFID tag in a chip 105 placed at the corner portions of four bet portions 103 facing to one another, by the antenna 104 placed at the corner portions.

As described above, by reducing the size of the antennas 104 and densely placing many antennas 104 in association with the upper surface 101 of the betting board, it is possible to accurately read the chips 105 placed at various positions on the betting board.

Furthermore, in cases of using a betting board for roulette games, there is a need for reading the RFID tags in all betted chips 105 within a limited time. Accordingly, as the number of antennas 104 is increased, the time for reading RFID tags allocated to each single antenna 104 becomes significantly decreased.

Further, when the antennas 104 generate electromagnetic waves, more specifically magnetic fields, the magnetic fields will cause an RFID tag to generate electricity and to return signals to the antennas 104. At this time, in cases where the RFID tag performs modulation thereon, the RFID tag turns on and off a resistance or capacitance which forms a load so as to change the electric current flowing through the coil in the RFID tag, and generates a counter magnetic field, thus realizing load modulation.

The contents of JP-A 2004-105321 and JP-A 2004-102953 are incorporated herein by reference in their entirety.

However, in the aforementioned example, signals returned from the RFID tags through the load modulation are significantly smaller than the magnetic fields outputted from the antennas 104 and, in a case where noise and the like are mixed therewith, it becomes impossible to correctly read the RFID tags.

Accordingly, when high-speed switching among the many antennas 104 is performed in order to read the RFID tags in the respective chips 105, this high-speed switching among the antennas 104 will induce high-frequency noise, thereby causing a problem of making it impossible to correctly read the information in the RFID tags.

It is an object of the present invention to make it possible to accurately read the RFID tags in all chips placed at respective positions on a betting board, by preventing the RFID tags from being unreadable due to the generation of high-frequency noises.

SUMMARY OF THE INVENTION (1) A game betting device of the present invention includes: a betting board having a plurality of sections formed thereon; a plurality of first antennas that are provided in association with each of the sections, and that generate electromagnetic waves causing an RFID tag provided in a game chip placed on the betting board to generate electricity; at least one or more second antennas that are provided in association with a set of the plurality of the first antennas, and that receive a signal from the RFID tag; a first-antenna driving unit that drives each set of the plurality of first antennas associated with each second antenna while successively changing over among the plurality of first antennas; and a second-antenna driving unit which, while any of the plurality of the first antennas associated with the second antenna generates an electromagnetic wave, drives this second antenna.

According to the invention, the plurality of first antennas for causing RFID tags to generate electricity are provided in association with each section; and the first antennas for causing the RFID tags to generate electricity and the second antennas for reading information from the RFID tags are separated and placed separately from each other. Further, a multitude of first antennas are placed in association with the respective relatively small areas, while each single second antenna is associated with the plurality of first antennas and, accordingly, the respective second antennas are placed to cover larger areas. Accordingly, only a small number of second antennas are required to be placed, which can make the number of successive changeover among the respective second antennas smaller. This allows lower-speed switching for changeover among the second antennas, which prevents the occurrence of high-frequency noise. Accordingly, even though signals returned through load modulation from the RFID tags are significantly smaller than the outputs of the magnetic fields generated from the second antennas, no noise and the like are mixed therewith, which enables reading the information in the RFID tags with higher accuracy.

Further, with the aforementioned structure, even when game chips are betted on various positions on the areas formed by the plurality of sections on the betting board, it is possible to cause the RFID tags to generate electricity properly and to cause the RFID tags to operate correctly. Further, the information in the RFID tags can be accurately read through the second antennas provided in association with the plurality of first antennas.

(2) In this case, the respective first antennas are provided at the center portions of the sections and at the boundary areas between the sections.

According to the invention, either when a game chip is placed at the center portion of a section or when a game chip is placed at the boundary portion between sections, the RFID tag in this game chip can be properly caused to generate electricity, since the first antennas are placed in association with these positions.

(3) Also, a plurality of the second antennas are provided, and the second-antenna driving unit drives second antennas that are not adjacent to one another out of the plurality of the second antennas, simultaneously in parallel, while the first-antenna driving unit drives, simultaneously in parallel for said second antennas being driven simultaneously in parallel, sets of the plurality of the first antennas associated with the plurality of the respective second antennas that are driven simultaneously in parallel.

According to the invention, the plurality of second antennas are driven simultaneously in parallel and, also, the first antennas associated with the plurality of second antennas being driven simultaneously in parallel are driven simultaneously in parallel, which can shorten the time required for reading the RFID tags in all the game chips on the betting board.

According to the present invention, it is possible to prevent RFID tags from being unreadable due to the occurrence of high-frequency noise, which enables reading the RFID tags in all the chips placed at respective positions on the betting board with higher accuracy.

DESCRIPTION OF THE EMBODIMENTS

Hereinafter, an embodiment of the present invention will be described, with reference to the drawings.

Figure 1:
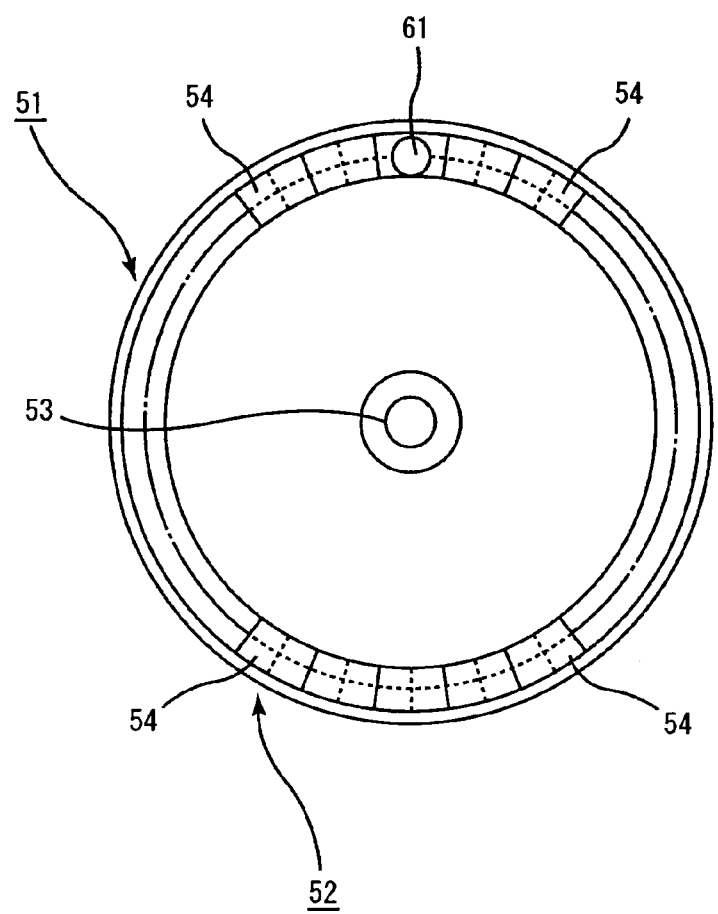
FIG. 1 is a plan view of a roulette wheel.
Figure 2:
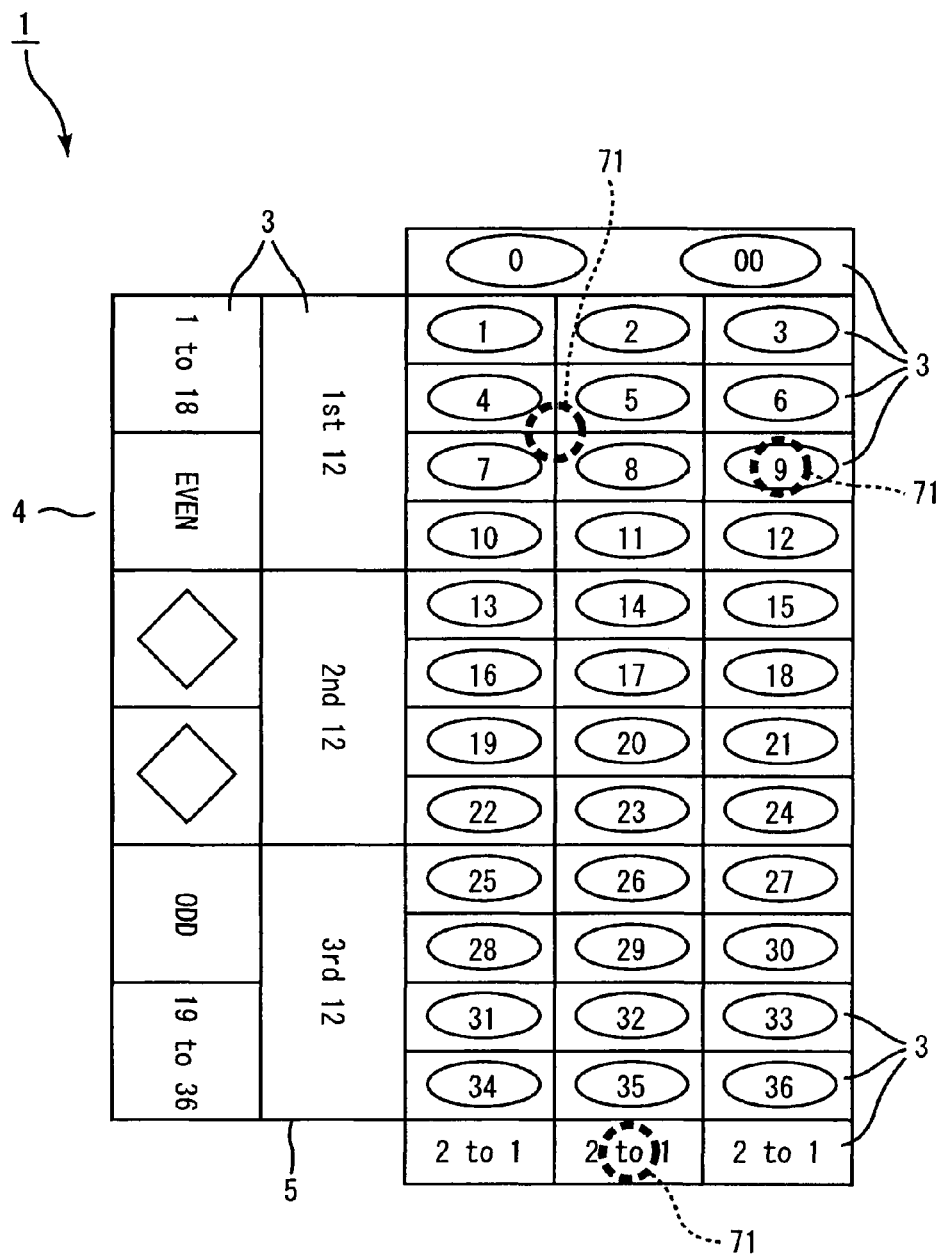
FIG. 2 is a plan view of a betting board in a game betting device.
Figure 3:
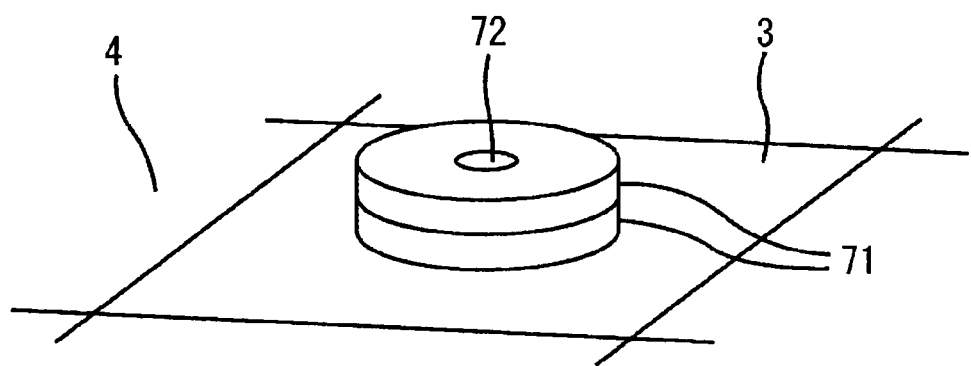
FIG. 3 is a partially-enlarged perspective view of the betting board.

FIG. 1 is a plan view of a roulette wheel. FIG. 2 is a plan view of a betting board in a game betting device. FIG. 3 is a partially-enlarged perspective view of the betting board.

A roulette wheel 51 and a game betting device 1 are used in a casino in a casino hotel, for example. Namely, a player plays various types of games in which he or she predicts the winning-number position to be resulted from throw of a roulette ball 61 onto the roulette wheel 51, and bets game chips 71 on a bet portion 3 corresponding to this winning-number position by using the game betting device 1.

The game betting device 1 includes a betting board 4 for use in placing bets of game chips 71, the betting board 4 being provided, on its upper surface, with a plurality of bet portions 3 (for example, respective spots defined by numbers of 0, 00, 1, 2, . . . , 35, and 36) corresponding to winning-number positions on the roulette wheel 51. The bet portions 3 on the betting board 4 are respective sections of the upper surface of the betting board 4 which are partitioned by frames 5. Each game chip 71 is provided with an RFID tag 72 having information about the game chip 71 recorded therein. On the roulette wheel 51, there is provided a winning-number detection device 52 detecting the winning-number position on the roulette wheel 51 and the type of the winning number, which are determined by the roulette ball 61. Further, the betting board 4 includes a bet-information detection device 11 (which will be described later) which, when the game chip 71 has been betted on a bet portion 3, reads the information about the game chip 71 recorded in the RFID tags 72 so as to detect the bet position of a game chip 71 and the value of the betted money. Further, although not illustrated, in the casino, there is prepared a payout calculation system (which will be described later) which calculates a payout resulted from this game (roulette game), based on the position of the roulette ball 61 on the roulette wheel 51, the bet position of the game chip 71, and the value of the game chip 71.

The information about the game chip 71 recorded in the RFID tag 72 includes information about a unique number for specifying this game chip 71 (a number for identifying the game chip 71), a value (1 dollar, 5 dollars, 10 dollars or the like) and a color, places in which the game chip 71 can be used (information for identifying casinos in which the game chip 71 can be used), and the like.

The winning-number detection device 52 is comprised of an ID reading device (which is not illustrated in detail). The ID reading device is comprised of an X-side transmission antenna and an X-side reception antenna which extend in parallel from an X-side scan driver, and a Y-side transmission antenna and a Y-side reception antenna which extend in parallel from a Y-side scan driver, such that these antennas are placed orthogonal to each other. With the ID reading device, when scan radio waves are generated from the X-side transmission antenna and the Y-side transmission antenna, reading radio waves are generated around the cross point of these antennas by the fluxes created due to the scan radio waves generated from the X-side transmission antenna and the Y-side transmission antenna. The reading radio waves are received by the X-side reception antenna and the Y-side reception antenna. When the roulette ball 61 is around the cross point, the reception state is changed since the roulette ball 61 is made to become dielectric due to the reading radio waves and the roulette ball 61 having been made to become dielectric causes an impedance change. The presence or absence of the roulette ball 61 is determined by detecting the state of the change.

More specifically, the roulette wheel 51 is structured as a circular rotational member and is provided with a total of 38 pockets 54 (only some of them are illustrated in the figure) concentrically about its center shaft 53. In the respective pockets 54, there are displayed numerals (for example, 0, 00, 1, 2, . . . , 35, and 36) corresponding to the plurality of bet portions 3 allocated on the betting board 4. The cross points of the ID reading device are placed for the 38 respective pockets 54 and, when the roulette ball 61 enters a pocket 54, the roulette ball 61 is positioned on one of the cross points. The aforementioned reading radio waves are continuously generated by the fluxes created due to the scan radio waves during a game and, when the roulette ball 61 is positioned on a cross point, only the reception state at this pocket 54 is changed. As a result, it becomes possible to detect which position (which pocket 54) on the roulette wheel 51 the roulette ball 61 has entered. The data detected at this time is transferred to a PTS (player tracking system) server (not illustrated) in the casino hotel, and the history of data detection is collectively managed in the server.

Further, the roulette ball 61 is provided with an RFID tag (not illustrated) in which roulette-ball identification information for identifying the roulette ball 61 is recorded. The RFID tag is embedded in the roulette ball 61, and the roulette-ball identification information includes information about the original place (place of manufacture, original casino where the roulette ball was used, original roulette board pocket in which the roulette ball was placed, or the like) of the roulette ball 61, the places in which the roulette ball 61 can be used (the casinos in which the roulette ball 61 can be used), the type of the ball, and the like. The roulette-ball identification information recorded in the roulette-ball identification information recording unit can be read by the ID reading device in the winning-number detection device 52. Further, based on the read information, it is possible to distinguish between the usable roulette ball 61 and other balls. It is therefore possible to prevent the occurrence of illegal acts and infringing acts, such as use of a forged roulette ball 61.

In the aforementioned game system, a person who desires to play games using the roulette wheel 51 enters the casino while carrying a certification card. The certification card is a card that a card issuing machine at the hotel front desk issues for the customer who has checked in at the casino hotel. The certification card is a card for identifying the customer and, after it is issued, the customer is allowed to use all facilities by presenting this certification card to be checked within the casino hotel. For example, at the checkout counter in a restaurant or a bar in the hotel, the certification card is read by a card reader and the demanded payment is accumulated in association with the identification number of this customer in the hotel server in this casino hotel; when the customer checks out of the casino hotel, all the demanded payment is displayed to a terminal at the hotel front desk. Namely, the certification card has the functions of a credit card usable for various types of payments within the casino hotel.

Further, when the customer enters the casino while carrying the certification card, he or she acquires a desired number of game chips 71 from a game-chip issue/accounting machine. Then, he or she sets the certification card in a reading device (not illustrated) for reading certification cards, the reading device being provided on the betting board 4. At this time, the reading device reads the content of the certification card to identify the customer and recognizes him or her as a participant of a game. The data recognized by the reading device is transferred to the aforementioned PTS server, and there the customer is registered as a participant of the current game. It is to be noted that the reading method for the certification card can be set to a desired method (a magnetic reading method or an optical reading method), according to the certification-card recording method (magnetic recording or optical recording).

In a roulette game, at first, a dealer rotates the roulette wheel 51 and, then, throws the roulette ball 61 onto the roulette wheel 51. During this time, participants of the game bet their own game chips 71 on desired bet portions 3 on the betting board 4. In the example of FIG. 2, a participant has placed a corner bet (on 4, 5, 7 and 8), another participant has placed a straight bet (on 9), and another participant has placed a column bet (on "2 to 1"). At this time, the bet-information detection device 11 detects the positions on which bets have been placed by the respective participants and the values of money betted by the respective participants (the amounts of betted money such as 1 dollar, 5 dollars, 10 dollars and the like). Then, the bet-information detection device 11 transmits the result of detection to the PTS server, and the history is collectively managed in the PTS server.

Thereafter, the speed of the rotation of the roulette wheel 51 decreases; when the roulette ball 61 enters a pocket 54 having a winning number of "8", the winning-number detection device 52 detects the winning-number position "8" determined by the roulette ball 61 and transmits the results of detection to the PTS server, and the history is collectively managed in the PTS server. It is to be noted that the PTS server may be adapted to collectively manage the histories and other various data about roulette wheels other than the roulette wheel 51 and about other gaming machines such as slot machines.

The payout calculation system is structured in an aggregation/analysis server (not illustrated) in the casino hotel, and the payouts resulted from this game (roulette game) are calculated based on the position of the roulette ball 61 on the roulette wheel 51 (the winning number "8", in the aforementioned example), the positions on which the game chips 71 have been betted, and the values of betted money.

Next, the bet-information detection device 11 in the game betting device 1 will be described in detail.

Figure 4:
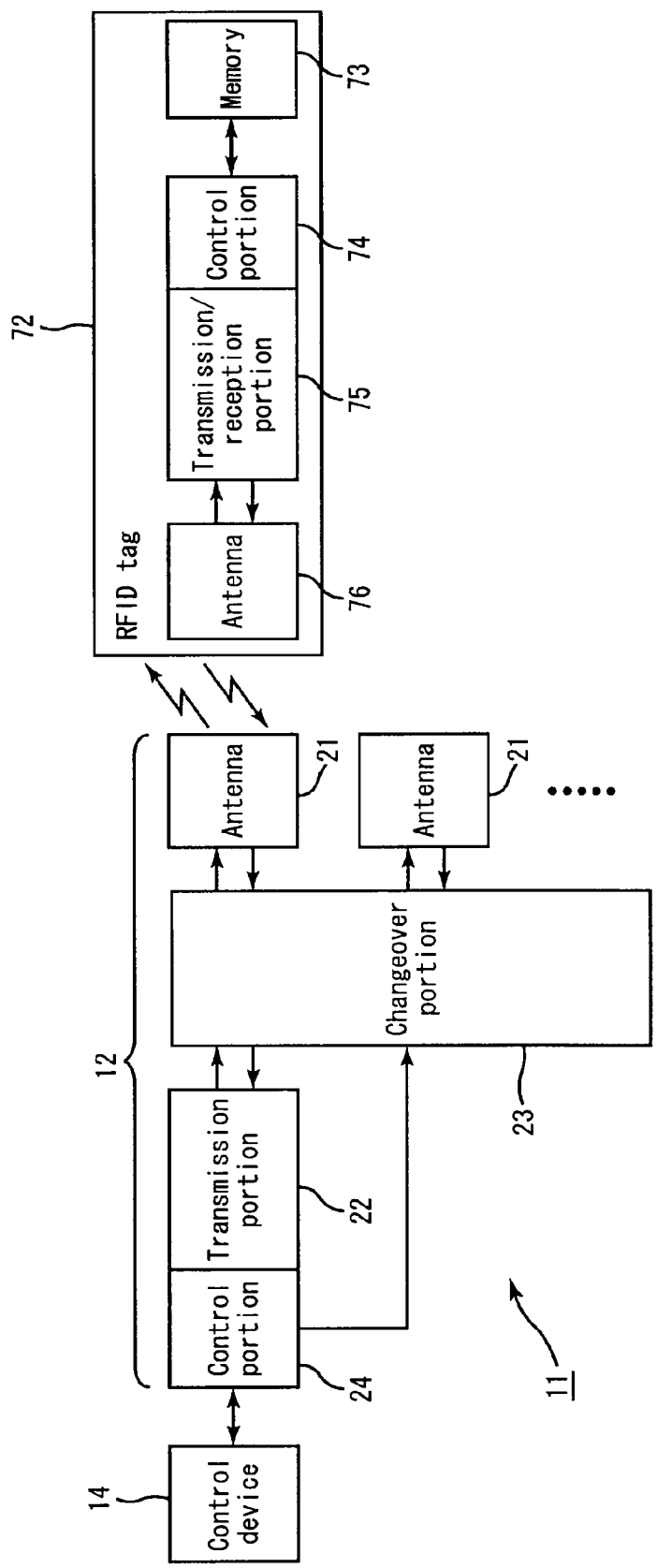
FIG. 4 is a block diagram of electrical connections among a charging device and a control device in a bet-information device, and an RFID tag.
Figure 5:
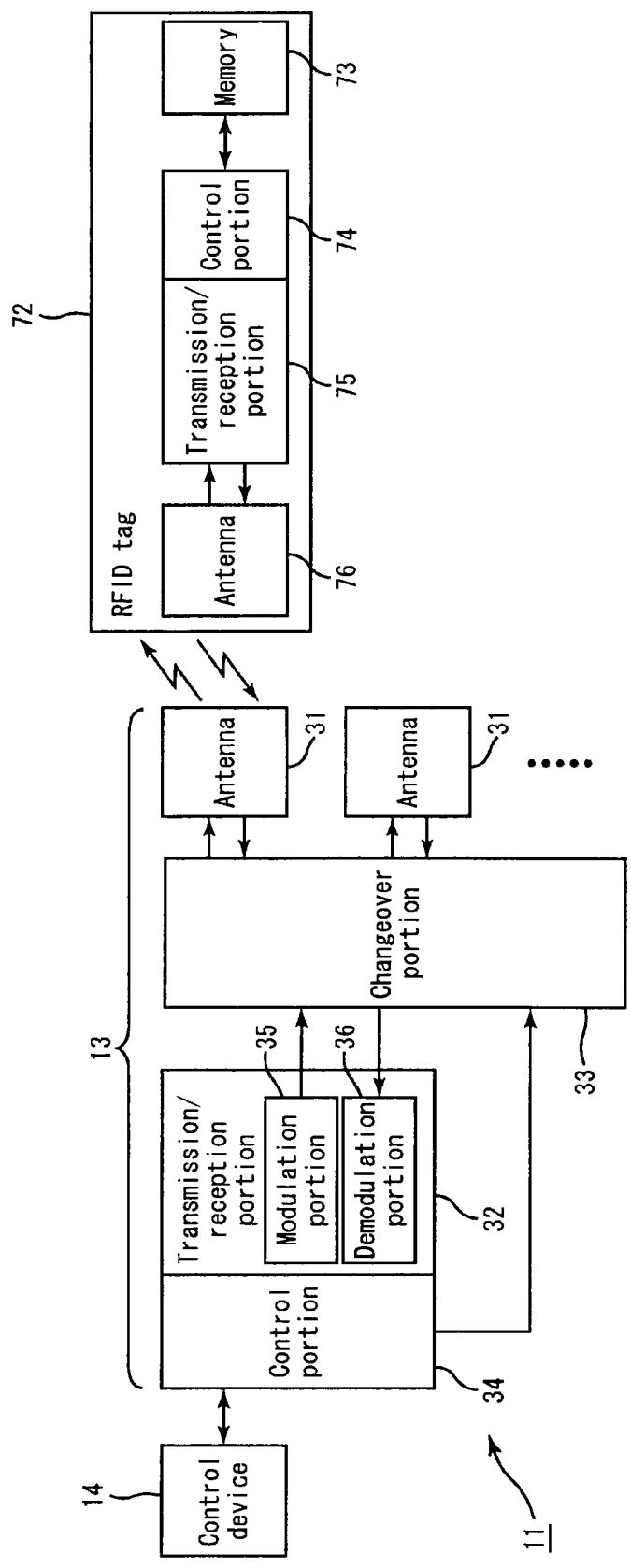
FIG. 5 is a block diagram of electrical connections among a reading device and the control device in the bet-information device, and the RFID tag.

FIG. 4 is a block diagram of electrical connections among a charging device 12 and a control device 14 in the bet-information device 11, and the RFID tag 72. FIG. 5 is a block diagram of electrical connections among a reading device 13 and the control device 14 in the bet-information device 11, and the RFID tag 72. Namely, the bet-information detection device 11 includes the charging device 12, the reading device 13 and the control device 14.

The control device 14 commands the charging device 12 to generate electromagnetic waves (a magnetic field) to cause the RFID tag 72 to generate electricity. Further, the control device 14 commands the reading device 13 to read the information recorded in the RFID tag 72 and to transmit the read data to the control device 14.

The charging device 12 includes a plurality of antennas (antenna coils) 21, a transmission portion 22, a changeover portion 23, and a control portion 24. The control portion 24 receives a command from the control device 14 and, in response to this command, drives the transmission portion 22 and the changeover portion 23. The transmission portion 22 energizes the antennas 21 to make them generate magnetic fields that are for causing the RFID tag 72 to generate electricity. The changeover portion 23 successively changes over among the respective antennas 21 to cause the respective antennas 21 to successively generate magnetic fields.

The reading device 13 includes a plurality of antennas (antenna coils) 31, a transmission/reception portion 32, a changeover portion 33, and a control portion 34.

The control portion 34 receives a command from the control device 14 and, in response to this command, drives the transmission/reception portion 32 and the changeover portion 33.

The transmission/reception portion 32 has the function of wirelessly communicating with the RFID tag 72 through the antennas 31. The transmission/reception portion 32 includes a modulation portion 35 and a demodulation portion 36. The modulation portion 35 modulates carrier waves in a predetermined modulation manner, based on information such as predetermined commands, requests and instructions which have been received from the control portion 34, in order to generate modulated carrier waves (modulated signals). Then, the modulation portion 35 supplies the modulated carrier waves (modulated signals) to the antennas 31. The demodulation portion 36 demodulates modulated signals modulated in a predetermined modulation manner, based on signals corresponding to the data stored in the RFID tag 72, then extracts signals corresponding to the data and transfers the signals to the control portion 34.

The antennas 31 emit the modulated carrier waves received from the modulation portion 35 toward the RFID tag 72, receive modulated signals emitted from the RFID tag 72, and supply the modulated signals to the demodulation portion 36.

The changeover portion 33 successively changes over among the respective antennas 31 to cause the respective antennas 31 to successively emit modulated carrier waves.

The RFID tag 72 is a so-called magnetic-field type RFID tag and includes a memory 73, a control portion 74, a transmission/reception portion 75 and an antenna (antenna coil) 76. The memory 73 is a storage device which stores information about a unique number for specifying the game chip 71 (a number for identifying the game chip 71), a value (1 dollar, 5 dollars, 10 dollars or the like) and a color, places in which the game chip 71 can be used (information for identifying casinos in which the game chip 71 can be used), and the like. The control portion 74 interprets commands, requests and instructions received from the reading device 13 and executes operations corresponding thereto. The transmission/reception portion 75 has a modulation portion (not illustrated) and a demodulation portion (not illustrated), and performs modulation/demodulation on signals in order to communicate with the reading device 13. The antenna 76 feeds electricity to the transmission/reception portion 75 through the magnetic field from the charging device 12 and, also, receives modulated waves from the transmission/reception portion 75 and emits the modulated waves in the air such that the modulated waves are received by the reading device 13.

As described above, the bet-information detection device 11 uses the charging device 12 to cause the RFID tag 72 to generate electricity, and makes the reading device 13 read the information in the RFID tag 72. Namely, generation of electricity from the RFID tag 72 and reading of the information in the RFID tag 72 are separately performed through the different antennas.

Next, the changeover portion 23 in the charging device 12 and the changeover portion 33 in the reading device 13 will be described.

Figure 6:
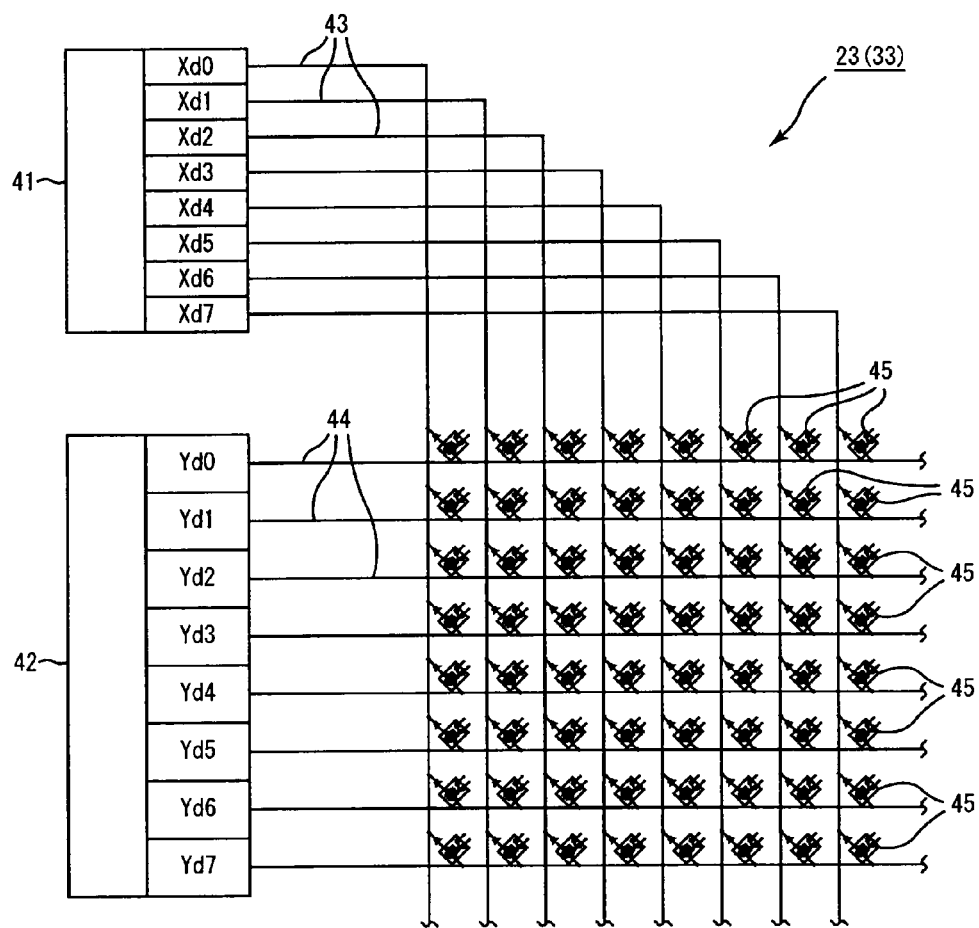
FIG. 6 is a circuit diagram that describes the structure of a changeover portion.
Figure 7:
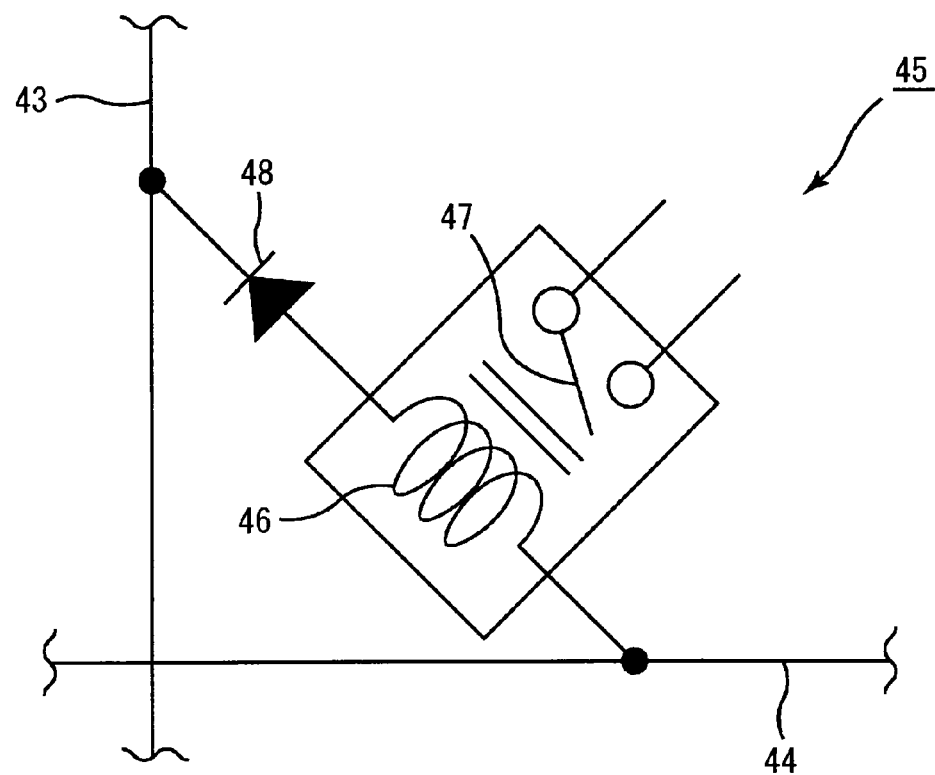
FIG. 7 is a circuit diagram that describes the structure of the changeover portion.
Figure 8:
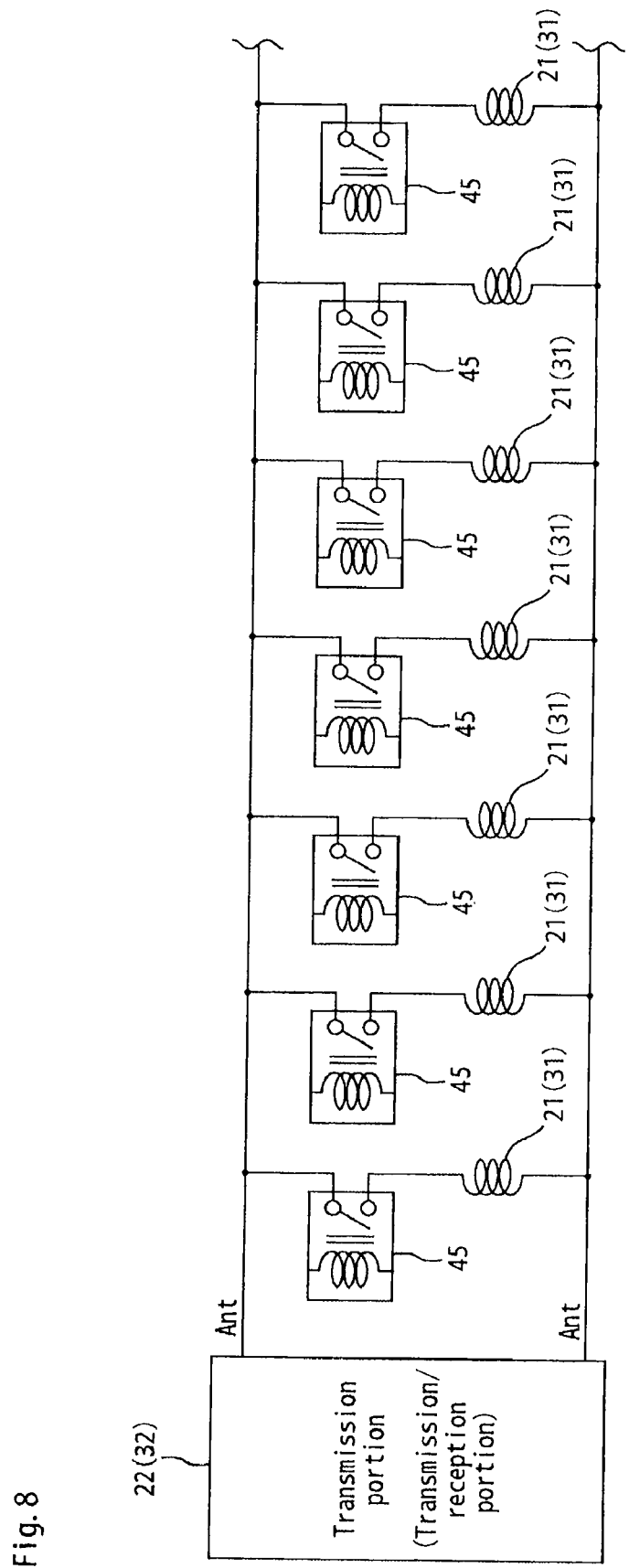
FIG. 8 is a circuit diagram that describes the structure of the changeover portion.

FIG. 6 to FIG. 8 are circuit diagrams for describing the structure of the changeover portion 23 (33). The changeover portion 23 and the changeover portion 33 have a basically similar structure, and will be described with reference to the same FIG. 6 to FIG. 8. The changeover portion 23 (33) includes an X-side scan driver 41 and a Y-side scan driver 42. A plurality of X-side transmission lines 43 extend in parallel with one another, from the X-side scan driver 41. Further, a plurality of Y-side transmission lines 44 extend in parallel with one another, from the Y-side scan driver 42. Either the plurality of X-side transmission lines 43 or the plurality of Y-side transmission lines 44 extend in the longitudinal direction, while the others of them extend in the lateral direction, such that they intersect with each other at respective positions. Further, at the respective cross points, there are provided relay circuits 45. In each relay circuit 45, a coil 46 is connected at its one end to the X-side transmission line 43 and also connected at its other end to the Y-side transmission line 44. A diode 48 is disposed on the X-side transmission line 43 side of the coil 46 such that the side of the diode 48 on the X-side transmission line 43 side is the cathode side while its side on the coil 46 side is the anode side. Usually, when each relay circuit 45 is kept at an OFF state, each X-side transmission line 43 is maintained at an H level, while each Y-side transmission line 44 is maintained at an L level. Further, when any of switches 47 of the relay circuits 45 is desired to be turned ON, the X-side transmission line 43 connected to the desired relay circuit 45 at this cross point is switched to an L level and, similarly, the Y-side transmission line 44 connected thereto at this cross point is switched to an H level. This energizes the coil 46, thereby closing the switch 47.

These respective relay circuits 45 are provided for the respective antennas 21 (31) such that there is a one-to-one correspondence therebetween. Namely, a single antenna 21 (31) is connected in series with a single relay circuit 45; when a relay circuit 45 is OFF, the antenna 21 (31) connected in series with this relay circuit 45 is not driven, but, when the relay circuit 45 is turned ON, the antenna 21 (31) connected in series with this relay circuit 45 is driven.

Next, the placement of the respective antennas 21, 31 will be described.

Figure 9:
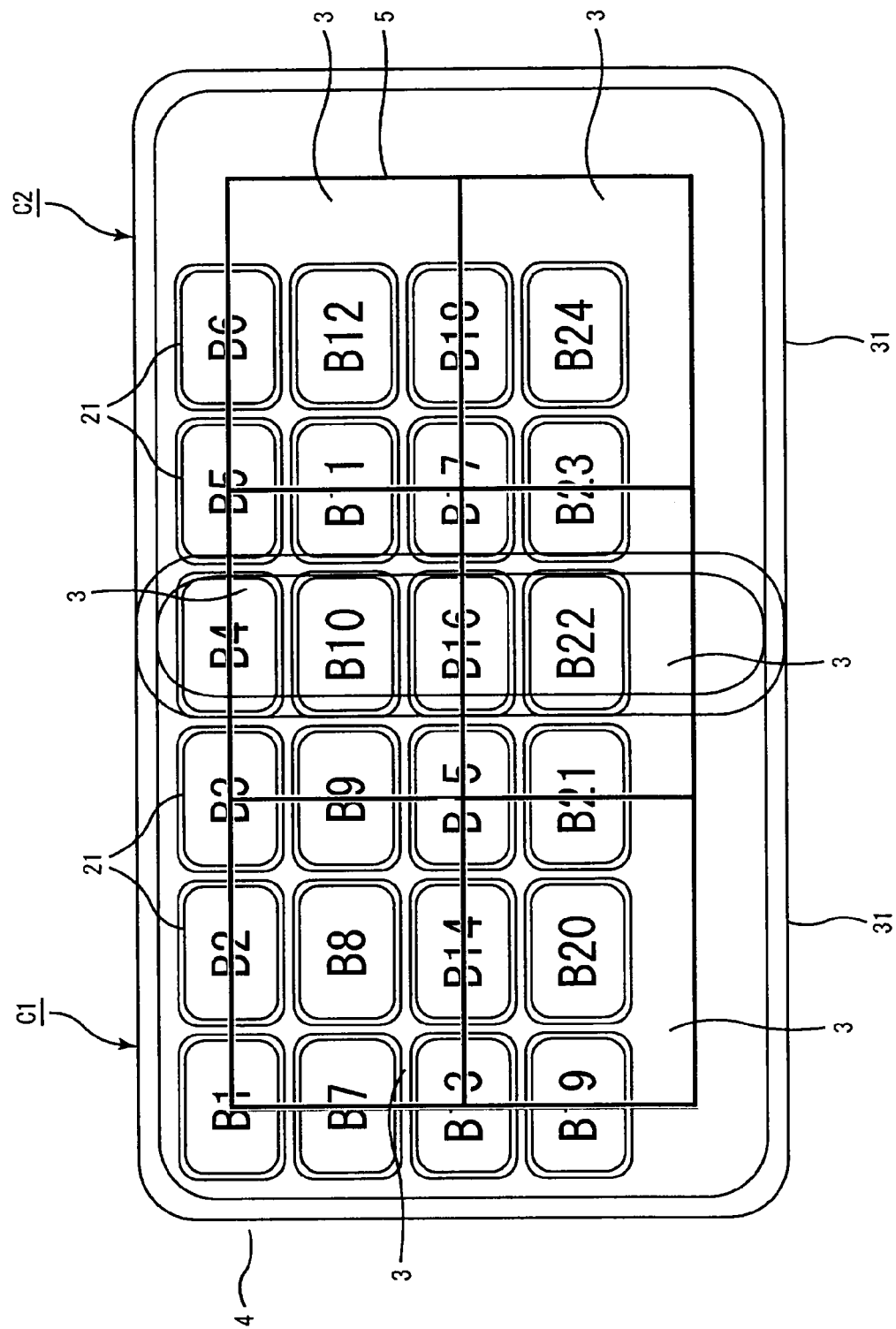
FIG. 9 is a plan view that describes the placement of respective antennas.

FIG. 9 is a plan view illustrating the placement of the respective antennas 21, 31. In FIG. 9, there are illustrated some of the bet portions 3 on the upper surface of the betting board 4. The antennas 21, 31 are placed at respective positions on the betting board 4.

First, the antennas 21 have longitudinal and lateral sizes which are substantially ½ of those of the respective bet portions 3. The plurality of antennas 21 are provided in each bet portion 3, in association with each bet portion 3. In the example of FIG. 9, the antennas 21 are placed at the center portion, the respective corner portions and the positions between these corner portions of each bet portion 3. More specifically, in FIG. 9, a total of 6 (=2×3) bet portions 3 are provided. For example, in the upper left bet portion 3, an antenna 21 of B8 is provided in association with the center portion, antennas 21 of B1, B3, B13 and B15 are provided in association with the four corner portions, and antennas 21 of B2, B7, B9 and B14 are placed in association with the positions between these four corner portions.

The antennas 31 have a longitudinal size which is approximately 2.5 times as large as that of the respective bet portions 3, and have a lateral size which is approximately twice as large as that of the bet portions 3. Each antenna 31 is provided in association with the plurality of antennas 21. In the example of FIG. 9, a single antenna 31 is associated with twenty antennas 21. Further, adjacent antennas 31 are provided such that parts of them overlap with each other. In the example of FIG. 9, an antenna 31 of C1 and an antenna 31 of C2 overlap partially with each other, and the respective antennas 21 of B4, B10, B16 and B22 are associated with both the antenna 31 of C1 and the antenna 31 of C2. It is to be noted that, although causing the RFID tags 72 to generate electricity is also possible by driving the antennas 31, the structure according to the present embodiment is adjusted such that it is impossible to cause RFID tags 72 to generate electricity so as to read information therefrom only by driving the antennas 31.

Next, there will be described, in detail, the driving of the respective antennas 21 for causing RFID tags 72 to generate electricity and the respective antennas 31 for receiving information from the RFID tags 72.

Figure 10:
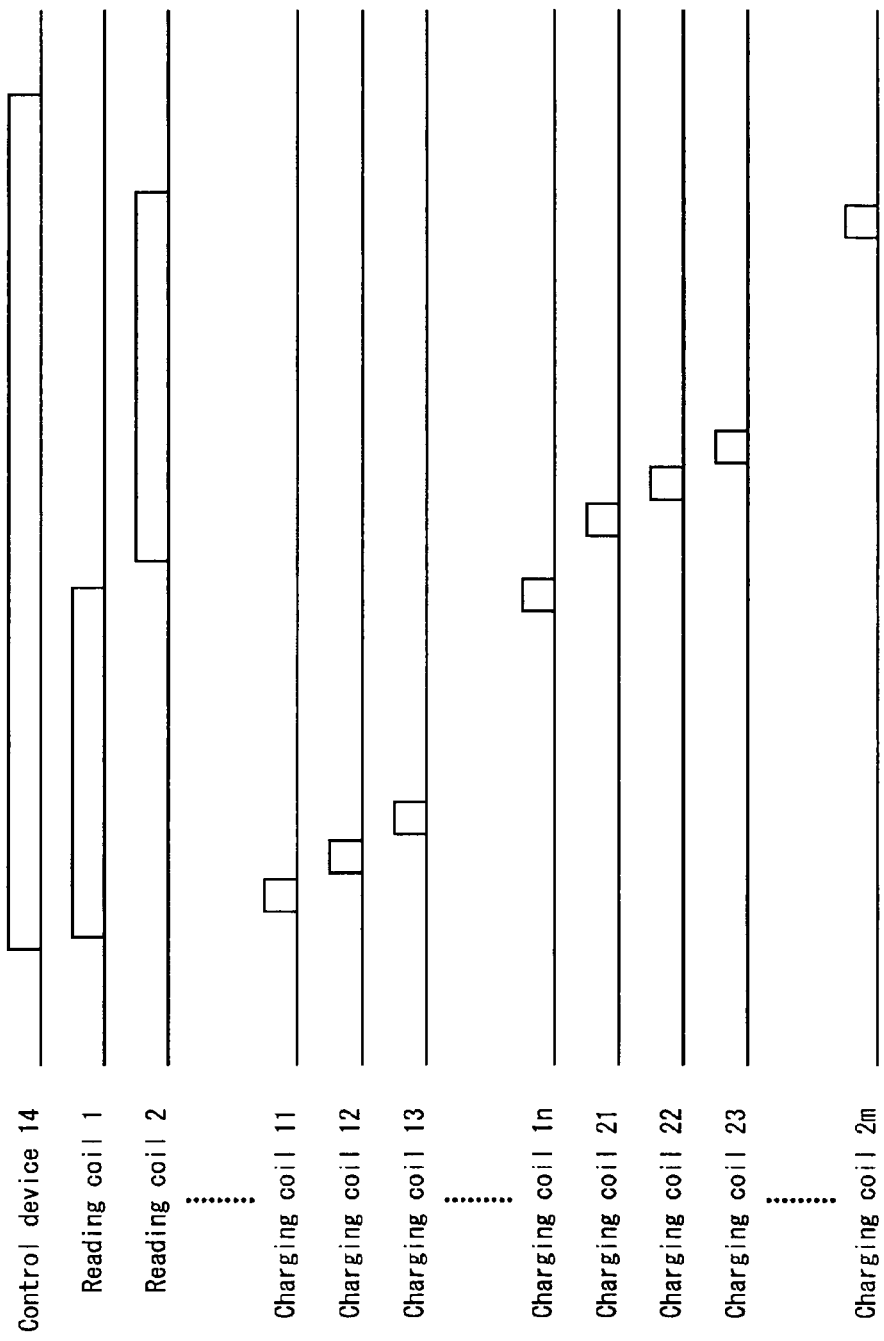
FIG. 10 is a timing chart that describes the driving of the respective antennas.

FIG. 10 is a timing chart describing the driving of the respective antennas 21, 31. In the same figure, there are illustrated the ON and OFF timings of the control device 14, the respective antennas 21 and the respective antennas 31. When the control device 14 is commanded to read the RFID tags 72 in respective game chips 71 betted on the betting board 4, the operation of the control device 14 is turned ON; and while the control device 14 is kept ON, the control device 14 controls the charging device 12 and the reading device 13 to cause the changeover portions 23, 33 to perform changeover operations, thereby successively driving the respective antennas 21, 31. Namely, the changeover portion 33 changes over among the antennas 31 so as to drive the antennas 31 one by one. In FIG. 10, the respective antennas 31 are illustrated as reading coils 1, 2, and so forth. Further, while a single antenna 31 is driven, successive changeover among the antennas 21 associated with this antenna 31 is performed. In FIG. 10, the antennas 21, which are the charging coils 11, 12, . . . , in (the charging coils corresponding to the reading coil 1 described above) and the charging coils 21, 22, . . . , 2n (the charging coils corresponding to the reading coil 2 described above), are successively changed over in association with the reading coils 1, 2 and so forth.

As described above, according to the game betting device 1 of the present embodiment, the antennas 21 for causing the RFID tags 72 to generate electricity have a relatively small size, and a plurality of the antennas 21 are provided in association with the respective bet portions 3. Accordingly, even when game chips 71 are placed on various positions on the areas formed by the plurality of bet portions 3 on the betting board 4, it is possible to cause the RFID tags 72 to generate electricity. Namely, it is possible to properly cause the RFID tag 72 to generate electricity, either when a game chip 71 is placed at the center portion of a bet portion 31, when a game chip 71 is placed at the boundary portion of two bet portions 3 or when a game chip 71 is placed at the position at which corner portions of four bet portions 3 are faced to one another. This is because the antennas 21 are placed in association with these positions. Accordingly, no matter what position on the areas constituted by the plurality of bet portions 3 a game chip 71 has been placed on, the RFID tag 72 in this game chip 71 can be properly operated. Further, since the RFID tags 72 are enabled to communicate with the reading device 13 through the antennas 31 provided in association with the plurality of antennas 21, the game betting device 1 can read accurately the information in the RFID tags 72 in all the betted game chips 71.

Further, according to the game betting device 1 of the present embodiment, the antennas 21 for causing RFID tag 72 to generate electricity are placed separately from the antennas 31 for reading the information in the RFID tags 72. Further, the plurality of antennas 21 are placed in association with the small areas, whereas each single antenna 31 is associated with the plurality of antennas 21 and accordingly is placed to cover a larger area. Since a great number of antennas 21 are provided, frequent changeover among the antennas 21 is performed as illustrated in FIG. 10. However, since a small number of antennas 31 are provided, the number of times of changeovers among the antennas 31 is small as illustrated in FIG. 10. This allows lower-speed switching among the antennas 31, thereby preventing the occurrence of high-frequency noise due to this switching. Accordingly, even though signals returned through load modulation from the RFID tags 72 are significantly smaller than the outputs of the magnetic fields generated from the antennas 31, no noise and the like are mixed therewith, which enables reading of the information in the RFID tags 72 with higher accuracy.

Figure 11:
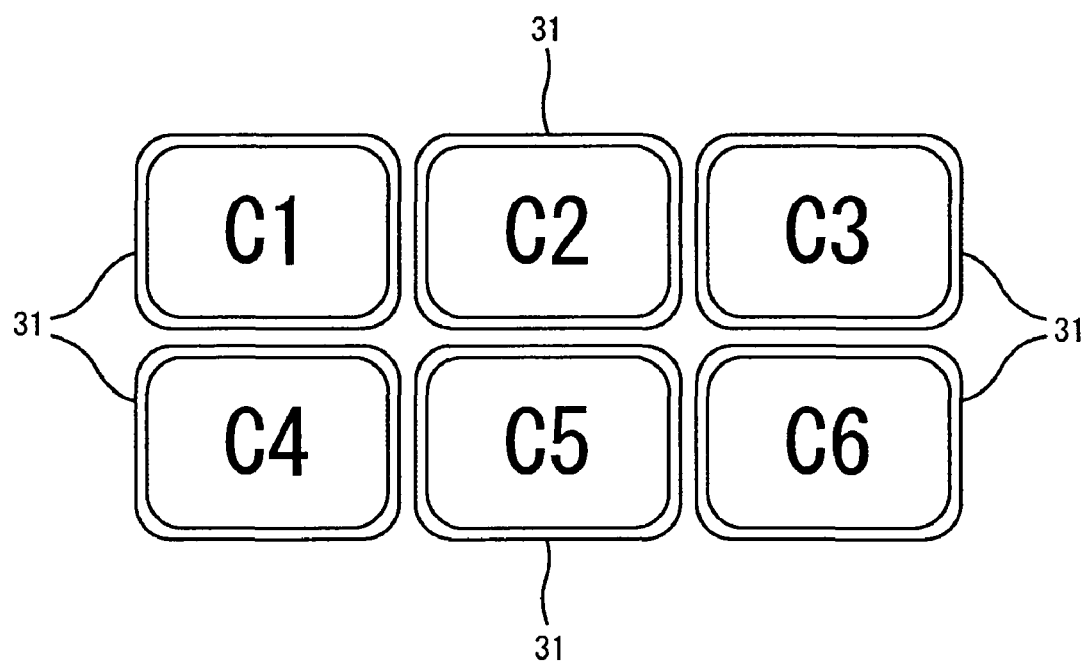
FIG. 11 is a plan view of the antenna placement, which describes the driving of the respective antennas.
Figure 12:
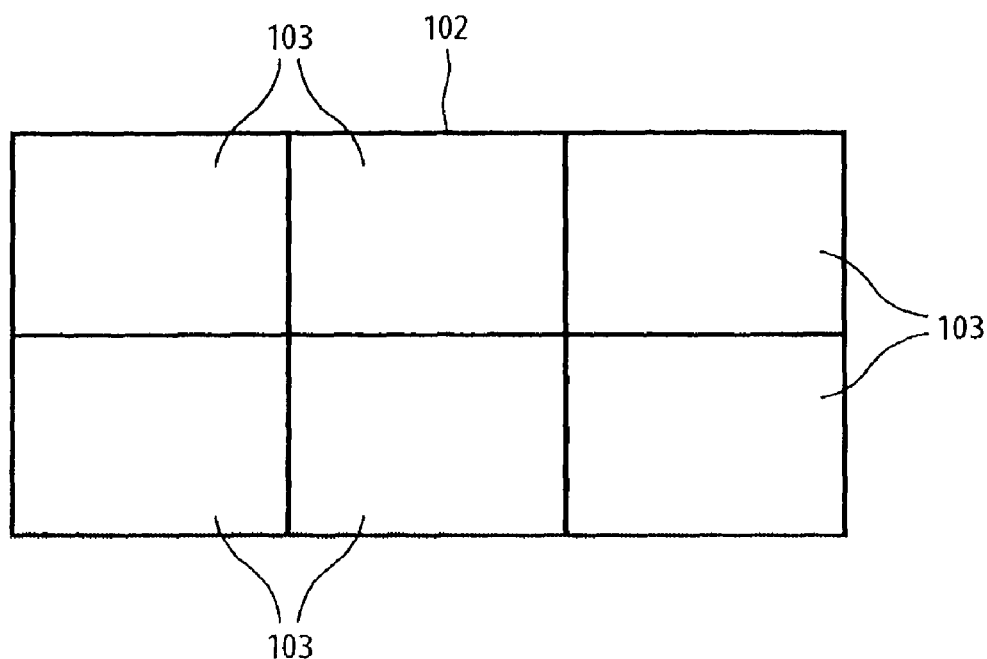
FIG. 12 is a plan view of a portion of the upper surface of a betting board, which describes the objects of the present invention.
Figure 13:
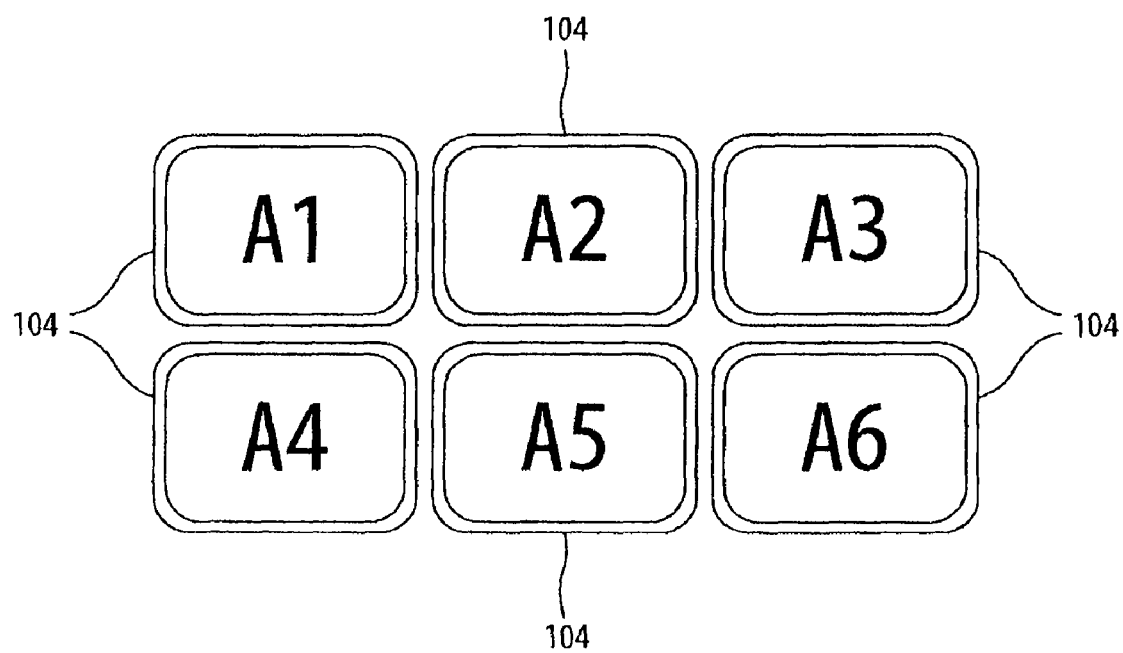
FIG. 13 is a plan view of the antenna placement in the betting board, which describes the object of the present invention.
Figure 14:
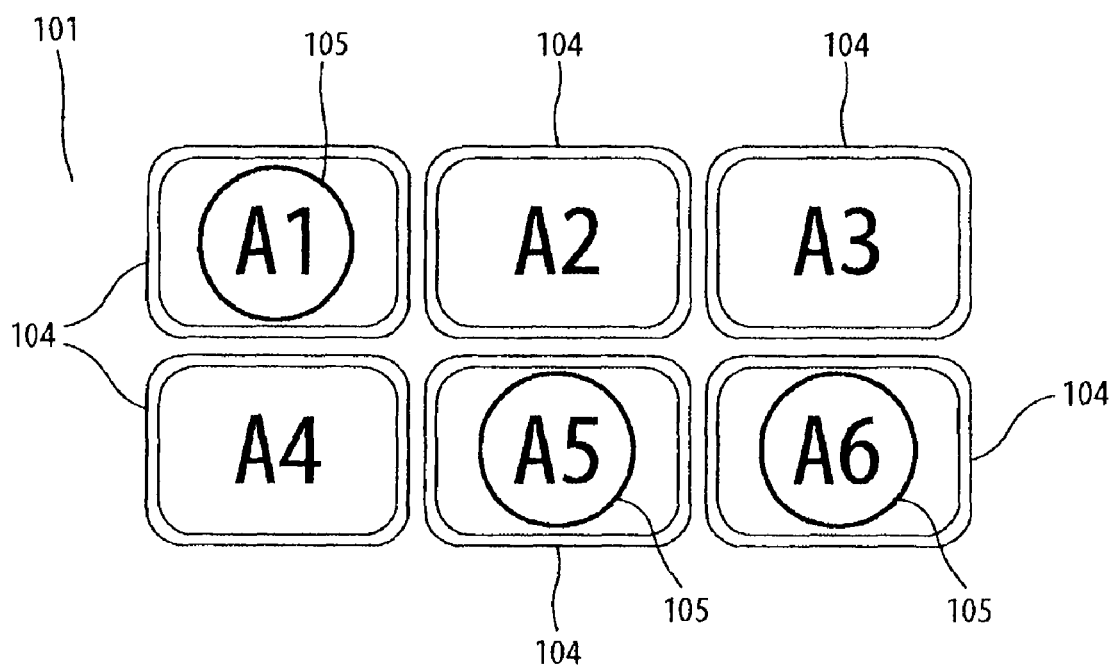
FIG. 14 is an exemplary placement of game chips on the betting board, which describes the object of the present invention.
Figure 15:
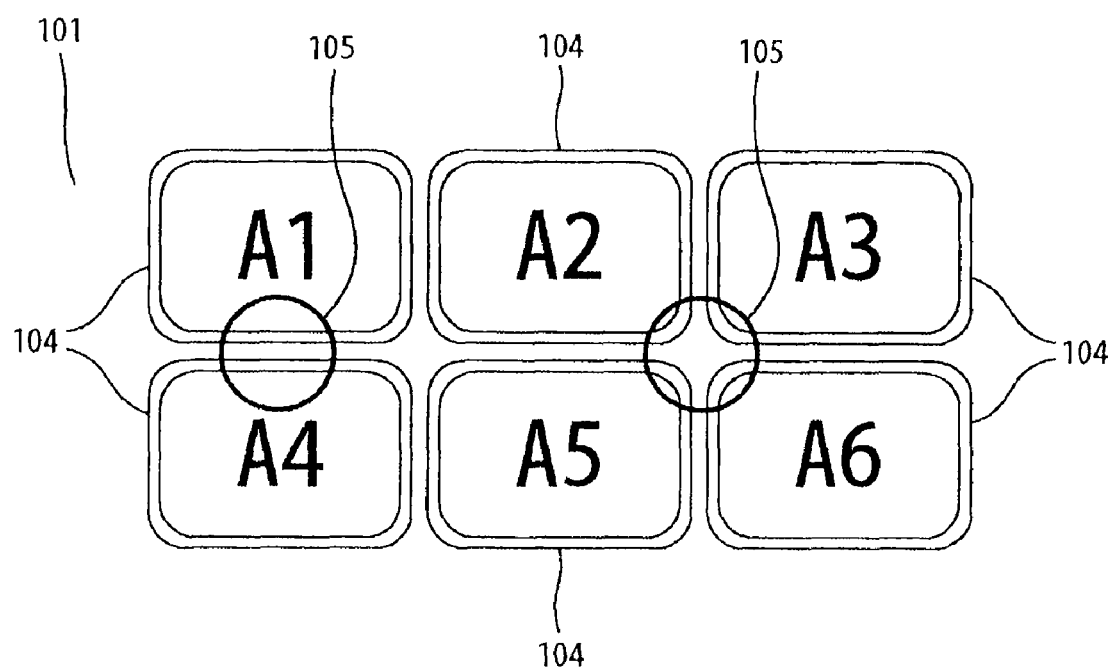
FIG. 15 is an exemplary placement of game chips on the betting board, which describes the object of the present invention.
Figure 16:
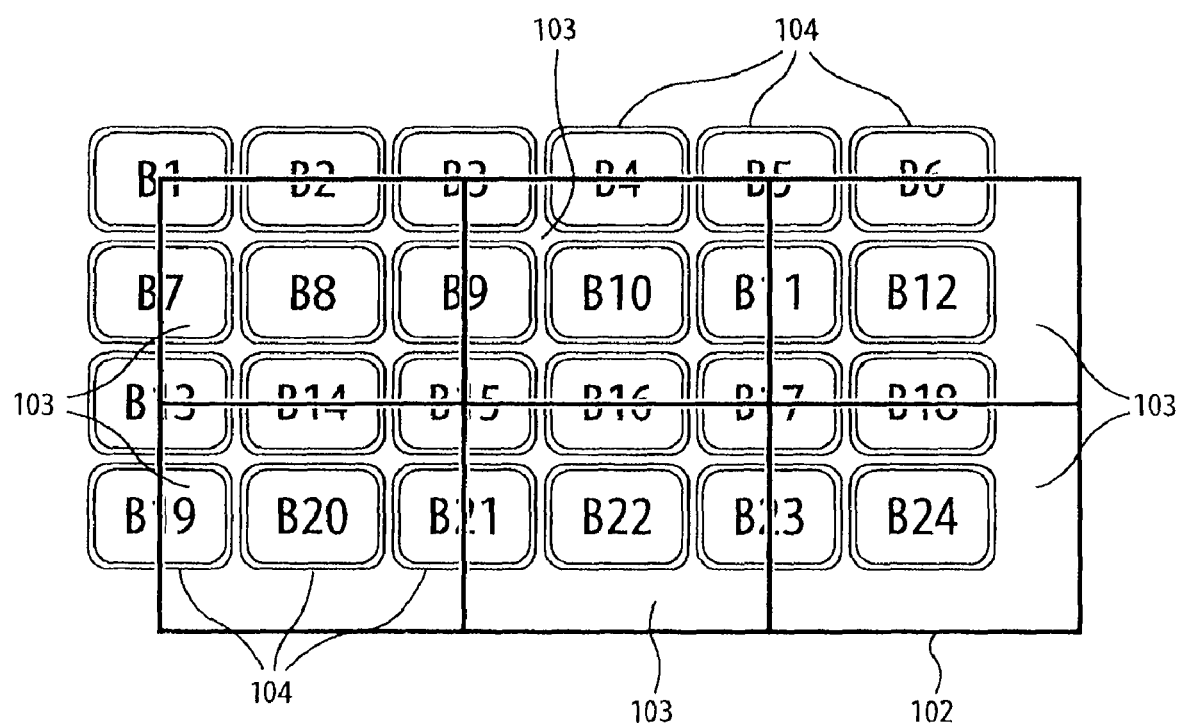
FIG. 16 is a plan view of the antenna placement in the betting board, which describes the object of the present invention.

Further, driving of the respective antennas 21, 31 may also be conducted as follows. Namely, in the case where the respective antennas 31 of C1 to C6 are placed as illustrated in FIG. 11, the antennas 31 of C1, C3 and C5 are not adjacent to one another and, also, the antennas 31 of C2, C4 and C6 are not adjacent to one another (only their corner portions are faced to one another). Accordingly, these antennas 31 which are not adjacent to one another are driven simultaneously. In the example of FIG. 11, the antennas 31 of C1, C3 and C5 are driven simultaneously in parallel and, thereafter, the antennas 31 of C2, C4 and C6 are driven simultaneously in parallel. In this case, the antennas 21 associated with the respective antennas 31 being driven simultaneously in parallel are likewise driven simultaneously in parallel. Namely, in the example of FIG. 11, when the antennas 31 of C1, C3 and C5 are driven simultaneously in parallel, the respective antennas 21 associated with the antenna 31 of C1 are successively driven, while the respective antennas 21 associated with the antenna 31 of C3 are successively driven simultaneously in parallel therewith and, the respective antennas 21 associated with the antenna 31 of C5 are successively driven simultaneously in parallel therewith. Similarly, when the antennas 31 of C2, C4 and C6 are driven simultaneously in parallel, the respective antennas 21 associated with the antenna 31 of C2 are successively driven, while the respective antennas 21 associated with the antenna 31 of C4 are successively driven simultaneously in parallel therewith and, the respective antennas 21 associated with the antenna 31 of C6 are successively driven simultaneously in parallel therewith.

By doing the aforementioned driving, the plurality of antennas 31 are driven simultaneously in parallel, which can shorten the time required for reading the RFID tags 72 in all the game chips 71 on the betting board 4.

What is claimed as new and desired to be secured by Letters Patent of the United States is:

1. A game betting device comprising:
    a betting board having a plurality of sections formed thereon;
    a plurality of first antennas that are provided in association with each of said sections, and that generate electromagnetic waves causing an RFID tag provided in a game chip placed on said betting board to generate electricity;
    at least one second antenna that is provided in association with a set of the plurality of said first antennas, and that receives a signal from said RFID tag;
    a first-antenna driving unit that successively drives each of the plurality of first antennas in the set associated with the at least one second antenna; and
    a second-antenna driving unit which, while any of the plurality of said first antennas associated with said at least one second antenna generates an electromagnetic wave, drives the at least one second antenna.
2. The game betting device according to claim 1, wherein said respective first antennas are provided at the center portions of said sections and at the boundary areas between said sections.
3. The game betting device according to claim 1, wherein a plurality of said second antennas are provided,
    said second-antenna driving unit drives second antennas that are not adjacent to one another out of the plurality of said second antennas, simultaneously in parallel, and
    said first-antenna driving unit drives, simultaneously in parallel for said second antennas being driven simultaneously in parallel, sets of the plurality of said first antennas associated with the plurality of said respective second antennas that are driven simultaneously in parallel.

* * * * *